(12) United States Patent
Donadon et al.

(10) Patent No.: US 10,945,363 B2
(45) Date of Patent: Mar. 16, 2021

(54) SOWING ELEMENT FOR PRECISION PNEUMATIC SEED DRILLS

(71) Applicant: MASCHIO GASPARDO S.P.A., Campodarsego (IT)

(72) Inventors: Gianfranco Donadon, Concordia Sagittaria (IT); Luigi Giovanni Bot, Portogruaro (IT); Bruno Miolo, Concordia Sagittaria (IT)

(73) Assignee: MACHIO GASPARDO S.P.A., Campodarsego (IT)

( * ) Notice: Subject to any disclaimer, the term of this patent is extended or adjusted under 35 U.S.C. 154(b) by 22 days.

(21) Appl. No.: 16/094,803

(22) PCT Filed: Apr. 21, 2017

(86) PCT No.: PCT/IB2017/052309
§ 371 (c)(1),
(2) Date: Oct. 18, 2018

(87) PCT Pub. No.: WO2017/182997
PCT Pub. Date: Oct. 26, 2017

(65) Prior Publication Data
US 2019/0116721 A1    Apr. 25, 2019

(30) Foreign Application Priority Data

Apr. 22, 2016   (IT) .................. 102016000041961

(51) Int. Cl.
*A01C 7/04*  (2006.01)
*A01C 7/20*  (2006.01)
(Continued)

(52) U.S. Cl.
CPC .............. *A01C 7/046* (2013.01); *A01C 5/064* (2013.01); *A01C 7/081* (2013.01); *A01C 7/206* (2013.01)

(58) Field of Classification Search
CPC ......... A01C 7/046; A01C 7/044; A01C 7/042; A01C 7/04; A01C 7/00; A01C 5/064; (Continued)

(56) References Cited

FOREIGN PATENT DOCUMENTS

DE    3826397    1/1989
EP    0150243    8/1985
(Continued)

OTHER PUBLICATIONS

International Search Report for International Application No. PCT/IB2017/052309 issued by the European Patent Office dated Aug. 4, 2017.

*Primary Examiner* — Christopher J. Novosad
(74) *Attorney, Agent, or Firm* — Stradley Ronon Stevens and Young, LLP

(57) ABSTRACT

A sowing element for precision pneumatic seed drills. The sowing element includes a selector disc for isolating the seed, the selector disc being rotatable about an axis (X), and a conduit for transporting the seed with an initial portion which is proximal to a position for removing the seed from the selector disc and an intermediate portion which extends in continuation of the initial portion. The conduit, at least in the initial portion and in the intermediate portion, is substantially rectilinear and substantially coaxial and has an axis (Y) which is located inside a plane which is substantially perpendicular to the sowing ground and parallel with the sowing advance direction.

18 Claims, 3 Drawing Sheets

(51) Int. Cl.
*A01C 5/06* (2006.01)
*A01C 7/08* (2006.01)

(58) Field of Classification Search
CPC ........... A01C 5/062; A01C 5/00; A01C 7/081;
A01C 7/08; A01C 7/206; A01C 7/20
See application file for complete search history.

(56) References Cited

FOREIGN PATENT DOCUMENTS

| | | |
|---|---|---|
| IT | PD20130320 | 5/2015 |
| WO | 2010/059101 | 5/2010 |
| WO | 2011/119095 | 9/2011 |
| WO | 2015/149728 | 10/2015 |

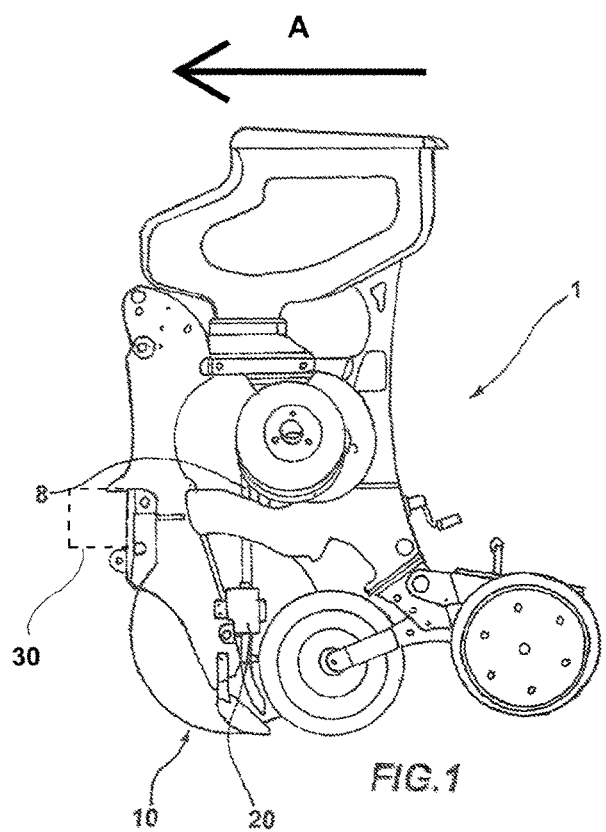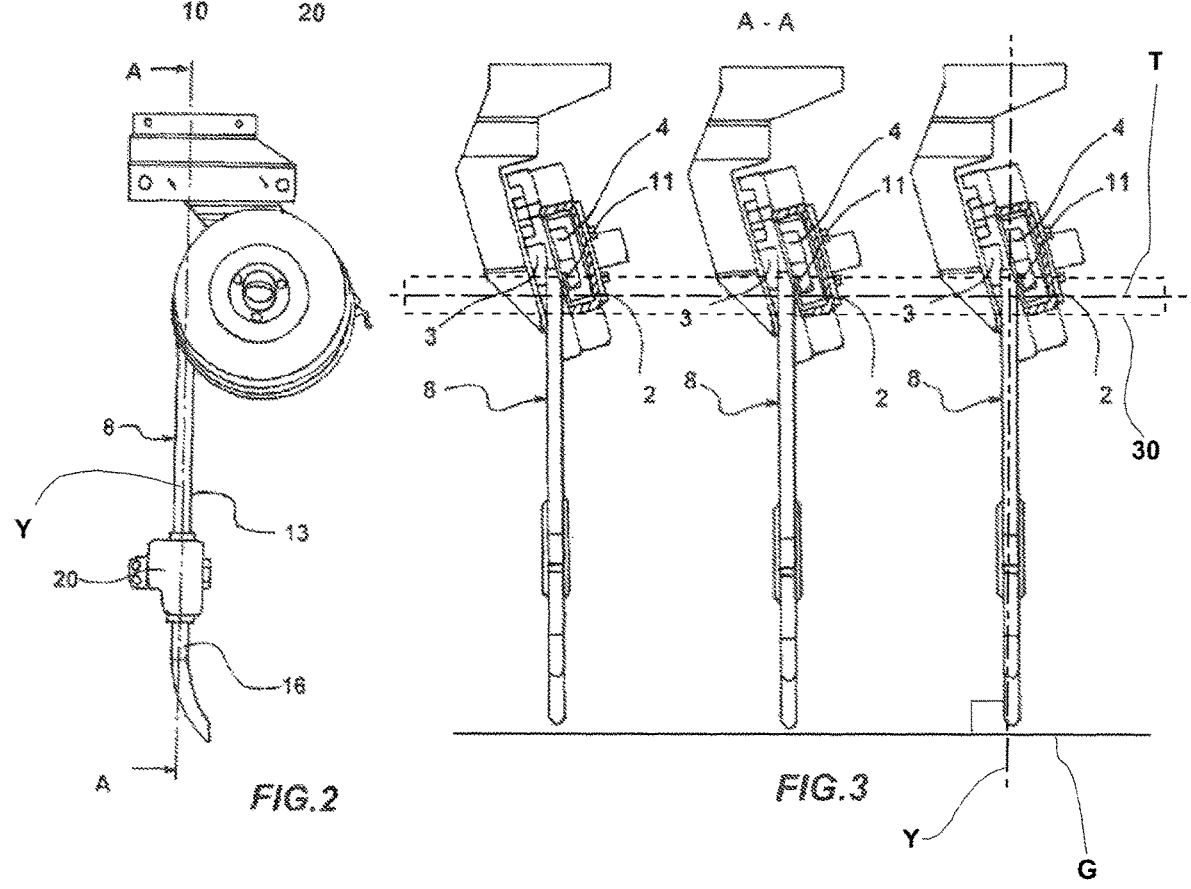
FIG.1
FIG.2
FIG.3

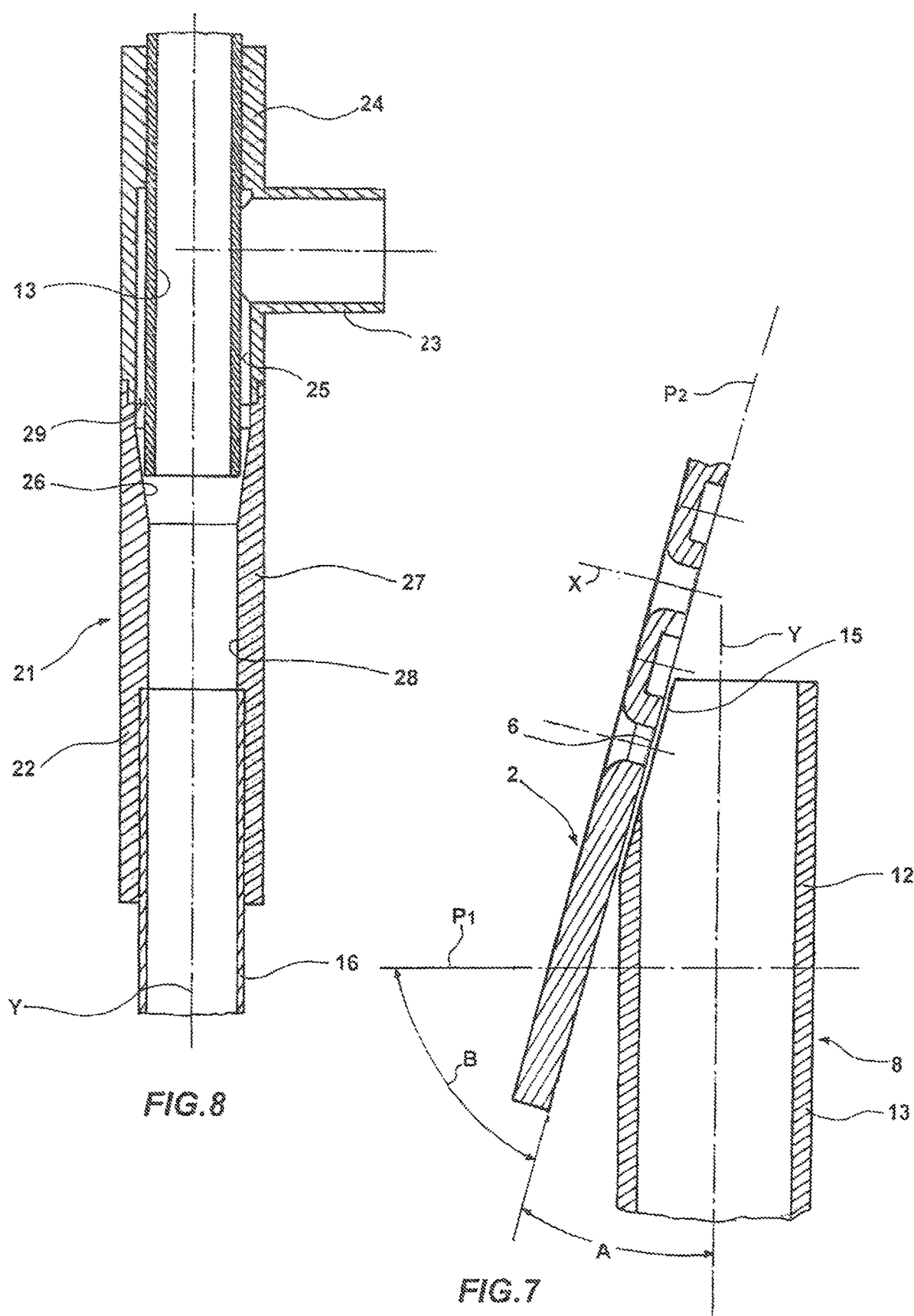

SOWING ELEMENT FOR PRECISION PNEUMATIC SEED DRILLS

RELATED APPLICATIONS

The present application is a U.S. national phase application of International Application No. PCT/IB2017/052309 filed on Apr. 21, 2017, which claims the benefit of priority to Italian Patent Application No. 102016000041961, filed on Apr. 22, 2016, the contents of which are incorporated in this application by reference.

TECHNICAL FIELD

The invention relates to a sowing element for precision pneumatic seed drills.

BACKGROUND OF THE DISCLOSURE

Typically, such sowing elements comprise a selector disc with one or more rings of through-holes which extend between opposite surfaces of the disc. The disc delimits in the sowing element two chambers which, using a pressurization system, are placed at different pneumatic pressures so that through the pressure differential the seeds are isolated in the region of the through-holes in order to be released in the region of the conduit for transporting the seed. An example of those seed drills is described in WO 2010/059101. Similar devices are also disclosed in WO 2015/149728, EP 150 243, DE 38 26 397 or WO 2011/119095.

In the technical field being referred to, there has arisen the requirement to accelerate the falling speed of the seed along the transport conduit in order to increase the sowing speed and the consequent productivity of the machine. However, an increase in the irregularity of the sowing distance between two contiguous seeds of the same row acts counter to the increase in the sowing speed, with a consequent adverse effect on the regular development of the growth and maturation of the plant. In fact, it is simply necessary to have small differences in the transport speed of the seed along the transport conduit to cause irregularity of the spacing of the sowing which is completely unacceptable. It is evident that those occurrences of irregularity increase with the increase in the sowing speed and therefore act directly counter to the requirement for increasing the sowing speed.

SUMMARY OF THE TECHNOLOGY

The problem addressed by this invention is to provide a sowing element for precision pneumatic seed drills which is structurally and functionally configured to overcome one or more of the disadvantages set out with reference to the prior art mentioned above, by improving in particular the constancy of the sowing spacing even at high sowing speeds.

This problem is confronted and solved by the invention by producing the conduit for transporting the seed in a rectilinear and coaxial manner to the greatest possible extent with a vertical orientation so as to prevent such deviations of travel of the seed in the transport conduit as to involve impacts and friction between the seed and the wall of the transport conduit itself.

In an embodiment, in order to make it easier to remove the seed from the selector disc towards the conduit for transporting the seed, the disc itself is inclined with respect to positioning with an axis parallel with the sowing ground. According to an aspect of the invention, the angle between a plane perpendicular to the axis of the conduit in the initial rectilinear portion and intermediate rectilinear portion of the same conduit and a plane perpendicular to the rotation axis of the disc is less than 90° and preferably between 60 and 80°.

In this manner, it is possible for the opening of the conduit to be able to be presented in an optimum manner with respect to the selector disc, for example, with a flute mouthpiece type cut, while maintaining the conduit for transporting the seed substantially rectilinear at least in the intermediate portion thereof and in the initial portion thereof, proximal to the disc.

Another advantage of the invention is that it is suitable for using a pneumatic flow accelerator to be arranged in the intermediate portion of the conduit for transporting the seed and preferably in the terminal portion of this intermediate portion, between it and a terminal portion of the conduit itself. This flow accelerator can be produced with a compressed air injector in the conduit for transporting the seed, for example, as described in the patent application PD2013A320 of the same applicant, the text and drawings of which are intended to be incorporated herein by reference. This flow accelerator produces inside the conduit a high-speed flow of air which greatly accelerates the movement of the seed.

The increase in the speed of the seed, which is much higher than that which would be obtained in a conventional falling system with only acceleration as a result of gravitational force, becomes evident as an equivalent substantial reduction in the transit time of the seed in the transport conduit and a reduced sensitivity of the seed itself to the vibrations of the sowing element and the impacts against the conduit for transporting the seed with a consequently improved regularity of the effective sowing pitch. This in turn allows a substantial increase in the sowing speed without the regularity of the sowing pitch being impaired thereby.

It is to be understood that both the foregoing general description and the following detailed description are exemplary, but are not restrictive, of the disclosure.

BRIEF DESCRIPTION OF THE DRAWINGS

The characteristics and advantages of the invention will be better appreciated from the detailed description of a preferred but non-limiting embodiment thereof which is illustrated by way of non-limiting example with reference to the appended drawings, in which:

FIG. 1 is a partial schematic view of a sowing element according to the invention, FIG. 2 is a detail of FIG. 1, FIG. 3 is a view in accordance with the section A-A of FIG. 2 of a series of sowing elements which are arranged so as to be aligned in accordance with the assembly position thereof on a pneumatic seed drill, FIG. 7 is a cross-sectional view of a detail of a sowing element according to the invention, and FIG. 8 is a cross-sectional view of another detail of a sowing element according to the invention.

DETAILED DESCRIPTION OF THE DISCLOSURE

Figure 6:
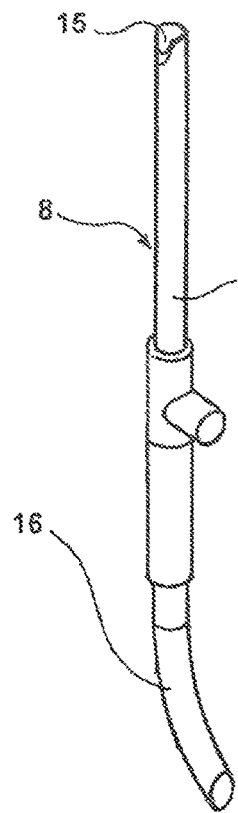
FIG. 6 is a schematic perspective view of a detail of a sowing element according to the invention.
Figure 4:
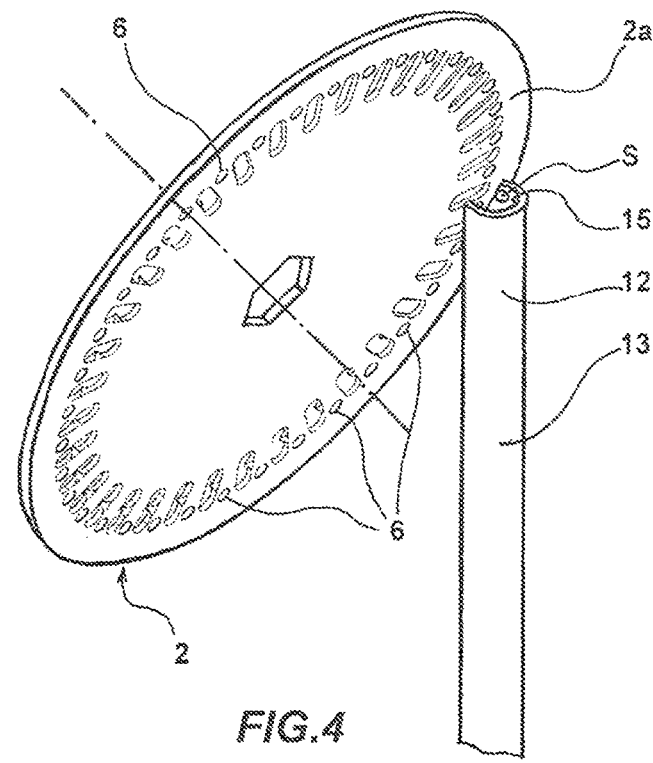
FIG. 4 is a schematic view of a detail of FIG. 3.
Figure 5:
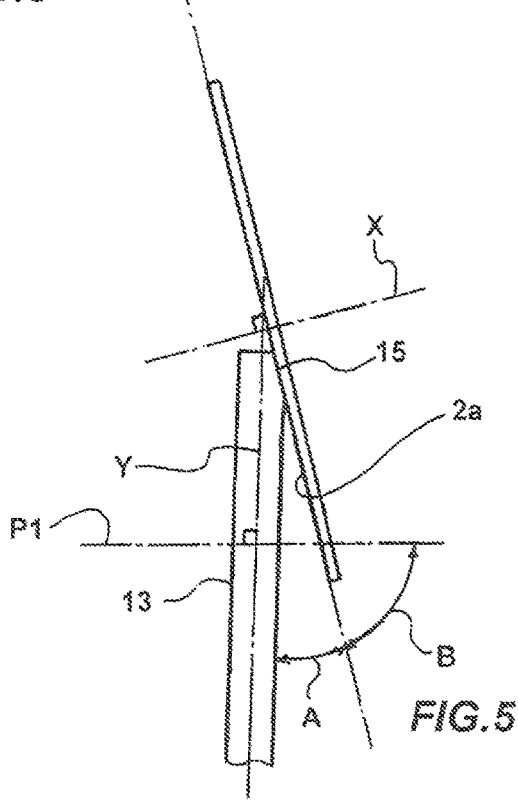
FIG. 5 is a side view of the elements of FIG. 4.

In FIG. 1 there is generally designated a sowing element 1 for precision pneumatic seed drills which is illustrated only schematically in terms of the necessary components thereof.

According to a preferred embodiment, the seed drill comprises a plurality of sowing elements 1 which are fixed in conventional manner to a support element 30 of the seed drill, which is schematically illustrated in the Figures by a bar. As shown in FIG. 3, the support elements 30 are connected to the seed drill by suitable connection elements, which are not illustrated in the Figures, so as to be aligned in a direction T which is substantially perpendicular to the sowing advance direction A.

With reference then also to FIG. 2, the sowing element 1 comprises a selector disc 2 which is for isolating the seed and which separates inside the sowing element two chambers 3, 4 which are intended to contain the seed to be isolated and to pressurize the sowing element 1, respectively. There is established between the above-mentioned chambers 3, 4 a pressure difference $\Delta p$ which is generated by a pneumatic device, for example, a centrifugal fan with high head. The effect is in any case that of generating and maintaining a pressure differential via a series of holes 6 which extend between the opposite surfaces of the selector disc 2, so as to cause a seed S to adhere there for each hole 6 and to transport the seed which is isolated in this manner towards a conduit 8 for transporting the seed with which the seed S is removed from the selector disc 2 and transported as far as the sowing furrow. That furrow is opened in the ground by a furrow opener 10, for example, of the type with a double disc coulter. A compaction wheel provides for retaining the seed S in the above-mentioned furrow and compressing it in the ground.

In order to obtain the isolation of the seed, the selector disc 2 is rotated about its own axis X which is generally perpendicular to the opposing surfaces of the selector disc 2 at a speed proportional to the advance speed of the sowing element 1 with respect to the ground. A runner 11 is arranged with quasi-adhesion against the opposite surface of the selector disc 2 to the one at which there are pneumatically gripped the seeds S so as to interrupt over a portion the pressure differential through the holes 6 and to bring about the detachment of the seeds selected from the selector disc 2 and the introduction thereof into the opening 15 of the transport conduit 8.

There is defined in the conduit 8 an initial portion 12 which is proximal to the selector disc 2 and which extends from the opening 15 away from the selector disc 2 and an intermediate portion 13 which extends in continuation of the initial portion 12 coaxially therewith. The conduit 8, at least in the initial portion 12 and in the intermediate portion 13, is substantially rectilinear and coaxial as well as being orientated with an axis substantially perpendicular to the sowing ground (or orientated backwards with respect to the sowing advance direction).

Where it may be necessary to adopt for structural reasons curves in the conduit 8, they will be mainly concentrated in a terminal portion 16 defining the opening 15 of the conduit 8 itself. For example, in the terminal portion 16 of the conduit 8 there could be provided a curve with the intention of directing the trajectory of the seed under the compaction wheel, as will be illustrated in greater detail below.

As is then shown in FIGS. 2 and 3, the conduit 8 at least in the initial portion 12 and in the intermediate portion 13 has an axis Y which is inside a plane substantially perpendicular to the sowing ground G and parallel with the sowing advance direction A.

Therefore, when the sowing element 1 is mounted on the seed drill, the plane in which the axis Y of the conduit 8 is located is substantially perpendicular to the alignment direction T which is defined above.

Therefore, when the pneumatic seed drill is on planar ground, the conduit 8 in the above-mentioned portions has a substantially vertical extent.

The opening 15 of the conduit 8 is preferably cut partially in the manner of a flute mouthpiece so as to promote a greater approach of the opening 15 to the corresponding surface 2a of the selector disc 2. The flute-mouthpiece-like cut involves an oblique section of the conduit 8 less than the total section thereof, that is to say, it does not reach the middle (axis Y) of the conduit 8 itself. Preferably, it is limited to between approximately a third and a fifth (or even less) of the circumferential section of the conduit 8 when it is constituted by a tube having a circular cross-section.

What is set out above prevents an excessive reduction of the inlet cross-section of the air into the conduit 8 for transporting the seed by limiting the inlet speed of the air drawn into the conduit 8 so as not to remove the seeds from the holes 6 before the interruption of the pressure difference $\Delta p$ by the runner 11.

The angle of incidence A between the surface 2a of the selector disc 2 facing the opening 15 of the conduit 8 and the axis Y of the conduit 8 itself is preferably between 10° and 30°. A preferred value is approximately 15°.

In other words, this means that the angle B between a plane P1 which is perpendicular to the axis Y of the conduit 8 in the rectilinear initial portion 12 and the rectilinear intermediate portion 13 and a plane P2 which is perpendicular to the rotation axis X of the selector disc 2 is less than 90°, preferably between 60° and 80°, more preferably is equal to 75°.

According to a preferred embodiment, the rotation axis X of the selector disc 2 is transverse to the alignment direction T and with respect to the sowing surface G on which the seed drill is located.

A pneumatic accelerator 20 of the type with a ring type ejector 21, as illustrated in FIGS. 2, 6 and 8, is inserted between the intermediate portion 13 and the terminal portion 16.

This ejector 21 comprises a hollow sleeve-like member 22 in which there are inserted:

- a compressed air inlet 23 which is directed tangentially and preferably in a radial direction with respect to the hollow sleeve-like member 22,
- a seed inlet 24 which is tubular and the outer wall of which delimits in the hollow sleeve-like member 22 an annular chamber 25 which is substantially coaxial with the seed inlet 24,
- a conical portion 26 which narrows from the annular chamber 25 towards an outlet conduit 27 and which is arranged with respect to the seed inlet 24 so as to form an annular passage 28 with a reduced cross-section with respect to the annular chamber 25 so as to generate a substantial acceleration in the air flow from the compressed air inlet 23 and to introduce this ring-like flow around the opening 29 of the seed inlet 24 into the ejector 21.

The pneumatic accelerator 20 is supplied with compressed air which is generated by a lobed compressor preferably of the positive-displacement type or by a compressor of the type with a side-channel blower.

As a result of the effect of the compressed air flow into the air inlet 23, it is possible for the portion of the conduit 8 positioned upstream of the ejector 21 to be located in a state of reduced pressure with respect to the portion of the conduit 8 downstream of the conduit 8 itself, generating a high-speed air flow which contributes, together with gravity, to the transport of the seeds S along the conduit 8, significantly accelerating the transit speed thereof with respect to the gravitational effect alone. As a result, there are further reduced the transit times of the seed in the conduit 8 with less sensitivity in respect of the seed itself to the vibrations of the sowing element 1 and the impacts against the conduit 8, which is generally advantageous for the regularity of the sowing pitch even at very high advance speeds of the sowing element 1.

As a result of this increased speed, the terminal portion 16 of the conduit 8 for transporting the seed may have a curvature with a large radius without negatively affecting the regularity of the sowing pitch.

The relationship between the total length of the initial portion 12 and the intermediate portion 13 and the length of the terminal portion 16 of the conduit 8 is preferably 2:1.

As a result of this condition, that is to say, the out-of-balance positioning of the ejector 21 in favor of proximity to the terminal portion 16, there is afforded the advantage of using both the effect of aspiration of air into the initial portion 12 and intermediate portion 13 of the conduit 8, which promotes the removal of the seed from the selector disc 2 and positively accelerates the movement thereof, and the effect of positive pressurization of the terminal portion 16 of the conduit 8 which prevents soil, dust and other contaminants from being drawn into the conduit 8 and rather promotes the expulsion thereof. Furthermore, the seed at the time of passage through the pneumatic accelerator 20 is already provided with a high speed and is therefore less sensitive to the turbulence generated by the pneumatic accelerator 20 itself.

Any deviations from the rectilinear path of the conduit 8 for transporting the seed have radii of curvature greater than 0.2 m.

The invention thereby solves the problem set out, achieving at the same time a plurality of advantages. In particular, the sowing element 1 according to the invention allows an improvement in the constancy of the sowing spacing even at high sowing speeds.

Although illustrated and described above with reference to certain specific embodiments, the present disclosure is nevertheless not intended to be limited to the details shown. Rather, various modifications may be made in the details within the scope and range of equivalents of the claims and without departing from the spirit of the disclosure. It is expressly intended, for example, that all ranges broadly recited in this document include within their scope all narrower ranges which fall within the broader ranges.

The invention claimed is:

1. A sowing element for a pneumatic seed drill which transports seed in a sowing advance direction and distributes the seed on a sowing ground, the sowing element comprising:
 a selector disc for isolating the seed, the selector disc being rotatable about a rotation axis, and
 a conduit for transporting the seed with an initial portion which is proximal to a position for removing the seed from the selector disc and an intermediate portion which extends in continuation of the initial portion and a terminal portion, wherein the conduit, at least in the initial portion and in the intermediate portion, is rectilinear and coaxial and has an axis which is located inside a plane which is perpendicular to the sowing ground and parallel with the sowing advance direction and in that an angle defined between a first plane which is perpendicular to the axis of the conduit in the rectilinear initial portion and rectilinear intermediate portion of the conduit and a second plane perpendicular to the rotation axis of the selector disc is between 60° and 80°.

2. The sowing element according to claim 1, wherein the conduit in the initial portion and in the intermediate portion is orientated backwards with respect to the sowing advance direction.

3. The sowing element according to claim 1, wherein the conduit at least in the initial portion and in the intermediate portion extends vertically during use when the sowing ground is substantially planar.

4. The sowing element according to claim 1, wherein the angle is substantially equal to 75°.

5. The sowing element according to claim 1, wherein the sowing element further comprises a pneumatic accelerator which is arranged along the conduit for transporting the seed.

6. The sowing element according to claim 5, wherein the pneumatic accelerator is positioned between the intermediate portion and the terminal portion of the conduit.

7. The sowing element according to claim 6, wherein the terminal portion has a length and the initial portion and the intermediate portion combine to have a total length that is greater than the length of the terminal portion.

8. The sowing element according to claim 7, wherein the total length of the initial portion and the intermediate portion is twice the length of the terminal portion of the conduit.

9. The sowing element according to claim 5, wherein the pneumatic accelerator includes a ring ejector.

10. The sowing element according to claim 9, wherein the pneumatic accelerator is supplied with compressed air which is generated by a lobed positive-displacement compressor or by a compressor having a side-channel blower.

11. The sowing element according to claim 1, wherein the terminal portion of the conduit for transporting the seed is rectilinear.

12. The sowing element according to claim 1, wherein the terminal portion has a curvature.

13. The sowing element according to claim 12, wherein the terminal portion deviates from the rectilinear initial and intermediate portions of the conduit for transporting the seed with a radius of curvature greater than 0.2 m.

14. The sowing element according to claim 1, further comprising a connection element with respect to the pneumatic seed drill, wherein the connection element is configured in such a manner that the conduit, at least in the initial portion and in the intermediate portion, is vertical when the sowing element is connected to the pneumatic seed drill.

15. The pneumatic seed drill comprising a plurality of sowing elements according to claim 1, the sowing elements being aligned in an alignment direction which is transverse to the sowing advance direction, the plane in which the axis of the conduit is located being perpendicular to the alignment direction, wherein the rotation axis of the selector disc of each sowing element is transverse to the alignment direction.

16. The pneumatic seed drill according to claim 15, further comprising a support element for the sowing elements, the support element having an elongate form so as to define the alignment direction.

17. A sowing element for a pneumatic seed drill which transports seed in a sowing advance direction and distributes the seed on a sowing ground, the sowing element comprising:
 a selector disc for isolating the seed, the selector disc being rotatable about a rotation axis;

a conduit for transporting the seed with an initial portion which is proximal to a position for removing the seed from the selector disc and an intermediate portion which extends in continuation of the initial portion and a terminal portion, wherein the terminal portion has a length and the initial portion and the intermediate portion combine to have a total length that is greater than the length of the terminal portion and wherein the conduit, at least in the initial portion and in the intermediate portion, is rectilinear and coaxial and has an axis which is located inside a plane which is perpendicular to the sowing ground and parallel with the sowing advance direction and in that an angle defined between a first plane which is perpendicular to the axis of the conduit in the rectilinear initial portion and rectilinear intermediate portion of the conduit and a second plane perpendicular to the rotation axis of the selector disc is between 60° and 80°;

a pneumatic accelerator positioned between the intermediate portion and the terminal portion of the conduit and arranged along the conduit for transporting the seed; and a connection element with respect to the pneumatic seed drill, wherein the connection element is configured in such a manner that the conduit, at least in the initial portion and in the intermediate portion, is vertical when the sowing element is connected to the pneumatic seed drill.

18. The pneumatic seed drill comprising a plurality of sowing elements according to claim 17.

* * * * *